(12) United States Patent
Choi et al.

(10) Patent No.: US 7,313,801 B2
(45) Date of Patent: Dec. 25, 2007

(54) DISK-CHUCKING DEVICE OF DISK DRIVE

(75) Inventors: Jun Kun Choi, Kyungki-do (KR); Seung Hee Suh, Kyungki-do (KR); Nam Seok Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 437 days.

(21) Appl. No.: 10/994,431

(22) Filed: Nov. 23, 2004

(65) Prior Publication Data
US 2006/0048176 A1   Mar. 2, 2006

(30) Foreign Application Priority Data
Sep. 1, 2004   (KR)  ............... 10-2004-0069661

(51) Int. Cl.
*G11B 17/028* (2006.01)
(52) U.S. Cl. .................... 720/709; 720/707
(58) Field of Classification Search ............ 720/703, 720/704, 706, 707, 709
See application file for complete search history.

(56) References Cited
FOREIGN PATENT DOCUMENTS

| JP | 11213498 A | * | 8/1999 |
|---|---|---|---|
| JP | 2000-030328 | | 1/2000 |
| JP | 2000262393 A | * | 9/2000 |
| JP | 2001-273695 | | 10/2001 |
| JP | 2002208202 A | * | 7/2002 |
| JP | 2002237118 A | * | 8/2002 |
| JP | 2004-199830 | | 7/2004 |
| JP | 2004-213812 | | 7/2004 |
| JP | 2004213812 A | * | 7/2004 |

* cited by examiner

*Primary Examiner*—William J Klimowicz
(74) *Attorney, Agent, or Firm*—Lowe Hauptman Ham & Berner

(57) ABSTRACT

The disk-chucking device includes a chuck base having a plurality of arranging parts recessed along an outer periphery of the chuck base and formed at the center of the chuck base with a central boss connected to the motor, a plurality of chuck pins respectively assembled to the arranging parts, a plurality of spring members elastically supporting a rear end of the chuck pins forwardly such that a leading end of the chuck pins can be exposed to an outer surface of the chuck base, and a rigid frame contacting the spring members and formed with a central hole such that the central hole has an inner diameter larger than an outer diameter of the central boss, thereby providing a degree of freedom, which allows the rigid frame to be moved in a horizontal direction within an allowable range.

12 Claims, 7 Drawing Sheets

DISK-CHUCKING DEVICE OF DISK DRIVE

RELATED APPLICATIONS

The present application is based on, and claims priority from, Korean Application Number 2004-69661, filed Sep. 1, 2004, the disclosure of which is hereby incorporated by reference herein in the entirety.

BACKGROUND OF THE INVENTION

1. Field of the Invention

The present invention relates to a device provided to a disk drive for chucking a disk, and more particularly to a disk-chucking device of a disk drive designed to reduce deviation of force between spring members transmitted to a disk through chuck pins, thereby enhancing a centering performance of matching the center of the disk to the rotational center of a motor.

2. Description of the Related Art

Generally, a disk drive comprises a deck base constituting a body of the disk drive, a loading-unloading means for loading or unloading the disk on the deck base, a rotation-driving means for rotating the disk loaded by the loading-unloading means at a predetermined velocity, and a recording and/or reproducing means for recording and/or reproducing information on a recording surface of the disk while being moved in a radial direction of the disk rotated by the rotation means. Here, the disk can be loaded or unloaded in a state of being mounted on a tray or can be inserted into or withdrawn from an interior of the deck base in a state of being received in a caddy or a cartridge by various types of disk drive known in the prior art.

Typically, as for the rotation-driving means, a spindle motor is employed to rotate the disk, and as for the recording and/or reproducing means, an optical pick-up unit is employed.

FIG. 1 is a plan view illustrating a disk drive with a general disk-chucking device, and FIG. 2 is a cross-sectional view illustrating the disk drive with the general disk-chucking device. Referring to FIGS. 1 and 2, the disk drive 1 comprises a disk-chucking device 10 for chucking a disk, to be rotated, on the top surface of a substrate 31 having an integrated circuit chip 32 and a plurality of connectors 33 and 34 mounted thereon, and a spindle motor 20 for supplying a rotational driving force.

The disk-chucking device 10 provided to the disk drive 1 acts to maintain stability of the disk rotated in one direction by virtue of the rotational driving force of the spindle motor 20 while fixing the disk such that the center of the disk is matched to the rotational center of the motor. Thus, chucking performance of the disk-chucking device 10 is very important in the field of disk-chucking devices.

As shown in FIGS. 1 and 2, the disk-chucking device 10 is integrally equipped with a rotor case 24 of the spindle motor 20, which comprises a stator 20a with one or more coils 21 wound around a yoke 22 and a rotor 20b having a magnet 25 at a location corresponding to the coils 21. The rotor case 24 is provided, on an upper surface thereof, with a chuck base 12, which has a plurality of arranging parts 12a cut in a radial direction along an outer peripheral surface of an upper surface of the chuck base 12, and allows a central void of the disk to be inserted thereon.

A plurality of chuck pins 13 are assembled to the arranging parts 12a so that they are linearly moved along the arranging parts 12a, and are elastically and forwardly supported by virtue of an elastic force of spring members 15, respectively. Elastic pieces 14 are arranged between the arranging parts 12a of the chuck base 12 to elastically support the central void of the disk inserted into the chuck base 12 with a self-retaining elastic force of the elastic pieces 14.

In FIGS. 1 and 2, reference numeral 16 indicates a rubber material contacting a lower surface of the disk, reference numeral 23 indicates a holder for holding the yoke 22, reference numeral 26 indicates a shaft for supporting rotation of the rotor 20b against the stator 20a, reference numeral 27 indicates a bearing member, reference numeral 28 indicates a plate to close an opened lower step of the holder 23, and reference numeral 29 indicates a hall element.

According to a method of inserting and fixing the disk using a conventional disk-chucking device 10 with such a construction as described above, when the disk is vertically pushed down through the chuck base 12 from above, a lower end edge of an inner peripheral surface of the central void contacts the chuck pins 13 by way of interference with the chuck pins 13, since the chuck base 12 has an outer diameter lower than an inner diameter of the central void of the disk and each of the chuck pins 13 assembled to the chuck base 12 has a leading end extending in the direction of an outer periphery of the chuck base 12.

Here, each of the chuck pins 13 has an upper surface of the leading end gently and downwardly tapered. Accordingly, by virtue of a mounting force vertically applied to the chuck pins 13 from the disk, the chuck pins 13 are pushed backwardly while compressing the spring members 15, and the elastic members 14 are also pushed backwardly and then deformed.

Then, when the disk contacts the ring-shaped rubber material 16 mounted on the upper surface of the rotor case 24, the disk is chucked to the chuck base 12 so as to maintain a state of being inserted into the chuck base 12 by means of the plurality of chuck pins 13 tending to return to their initial locations by virtue of an elastic restoration force generated upon compression of the spring members 15.

Furthermore, the elastic pieces 14, provided between the chuck pins 13 such that the outer diameter of the elastic pieces 14, formed by drawing a line connecting the outer peripheral surfaces of the elastic pieces 14, is larger than the inner diameter of the inner peripheral surface of the central void of the disk, uniformly and elastically support the inner peripheral surface of the central void of the disk chucked by the chuck base 12 in the radial direction. Thus, the center of the disk can be matched to the rotational center of the spindle motor 20 by means of the elastic pieces 14.

Meanwhile, a force required for inserting and fixing the disk into the chuck base 12 of the disk-chucking device 10 is determined depending on the elastic force of the spring members 15 consistently supporting the chuck pins 13 forwardly. With regard to this, it is desirable that the spring members 15 respectively provided to the chuck pins 13 provide the identical elastic forces. However, in view of the process of manufacturing the spring members 15, it is difficult to practically produce spring members having identical elastic forces. Additionally, the spring members 15 are designed to have an elastic force higher than that of the elastic pieces 14.

Accordingly, in the case where the elastic force is applied excessively only to some of the chuck pins 13 due to disproportionate elastic force of the spring members 15 elastically supporting three or more chuck pins 13 provided to the chuck base 12, the disk is biased toward one side, where the elastic force of the spring members 14 is applied relatively excessively within a space defined between the inner peripheral surface of the central void of the disk and an outer peripheral surface of the chuck base 12, thereby causing eccentricity by which the center of the disk is not matched to the rotational center of the spindle motor 20 and thus deviates to one side.

Additionally, in case of a large eccentricity causing the center of the disk to be deviated from the rotational center of the spindle motor and biased to one side, the probability of error is increased when reading data on the disk or recording data on the disk using the optical pick-up unit, thereby impeding accurate and smooth operation of the recording and/or reproducing of the data on a recording surface of the disk.

Additionally, a moving distance of the optical pick-up unit is also increased by the degree of eccentricity, thereby increasing energy consumption for moving the optical pick-up unit, and lowering life span of the disk drive.

SUMMARY OF THE INVENTION

The present invention has been made to solve the above problems, and it is an object of the present invention to provide a disk-chucking device of a disk drive, designed to enhance a centering performance for accurately matching the center of the disk to a rotational center of a motor when chucking the disk.

In accordance with one aspect of the present invention, the above and other objects can be accomplished by the provision of a disk-chucking device of a disk drive, provided to a motor to supply a rotational driving force for chucking a disk to be rotated, the disk-chucking device comprising: a chuck base having a plurality of arranging parts recessed along an outer periphery of the chuck base on which a central void of a disk is correspondingly inserted, and formed at the center of the chuck base with a central boss connected to the motor so that the chuck base can be rotated together with a rotor of the motor; a plurality of chuck pins respectively assembled to the arranging parts so that they can reciprocate in a radial direction; a plurality of spring members elastically supporting a rear end of the chuck pins forwardly such that a leading end of the chuck pins can be exposed to an outer surface of the chuck base; and a rigid frame contacting the spring members at an outer surface of the rigid frame facing the chuck pins such that it can be elastically supported by the other end of the spring members having one end contacting the rear end of the chuck pins, the rigid frame being formed, at the center thereof, with a central hole vertically penetrating the rigid frame such that the central hole has an inner diameter larger than an outer diameter of the central boss, thereby providing a degree of freedom allowing the rigid frame to be moved in a horizontal direction within an allowable range such that the center of the disk can be matched to a rotational center of the motor upon inequality of elastic forces of the spring members.

Preferably, the rigid frame has a plurality of latches formed on the outer surface thereof facing the chuck pins for latching the other end of the spring members.

More preferably, the latches are formed at locations on the outer surface of the rigid frame corresponding to three apexes of an equilateral triangle centering on the central hole of the rigid frame, respectively.

More preferably, the latches are provided on flat planes formed at the locations on the outer surface of the rigid frame corresponding to the three apexes of the equilateral triangle centering on the central hole of the rigid frame, respectively.

Preferably, the distance between the inner peripheral surface of the central hole of the rigid frame and the outer peripheral surface of the central boss is larger than that between the inner peripheral surface of the central hole of the rigid frame and the outer peripheral surface of the chuck base.

Preferably, the chuck base has a plurality of cutaway sections formed between the arranging parts on the outer surface of the chuck base and a plurality of elastic pieces integrally provided to the cutaway sections for an automatic centering function, each of the elastic pieces elastically supporting the inner peripheral surface of the central void of the disk contacting an outer surface of a leading end of the elastic piece with its elastic force.

BRIEF DESCRIPTION OF THE DRAWINGS

The foregoing and other objects and features of the present invention will be more clearly understood from the following detailed description taken in conjunction with the accompanying drawings, in which:

FIGS. 3a to 3c show a disk-chucking device of a disk drive according to the present invention, in which FIG. 3a is a plan view, FIG. 3b is a longitudinal section view, and FIG. 3c is a rear elevation;

DESCRIPTION OF THE PREFERRED EMBODIMENTS

Preferred embodiments will now be described in detail with reference to the accompanying drawings.

Figure 1:
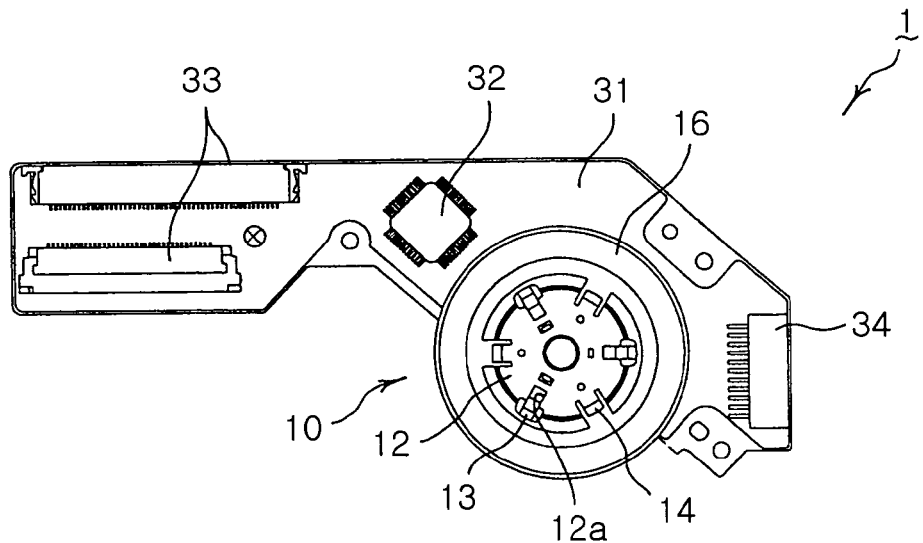
FIG. 1 is a plan view illustrating a disk drive with a conventional disk-chucking device.
Figure 2:
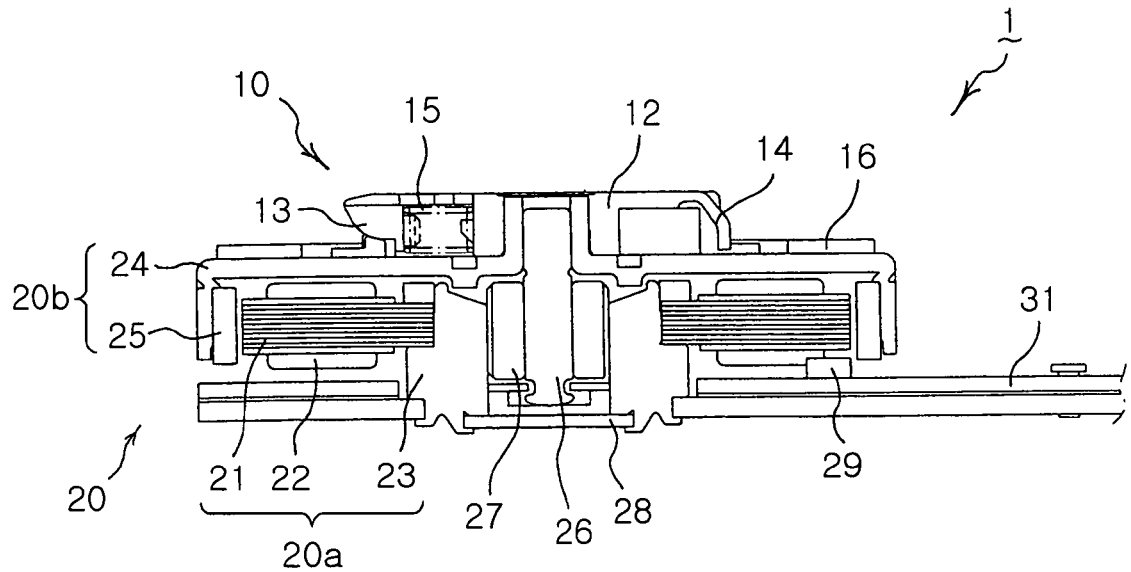
FIG. 2 is a cross-sectional view illustrating the disk drive with the conventional disk-chucking device.
Figure 3A:
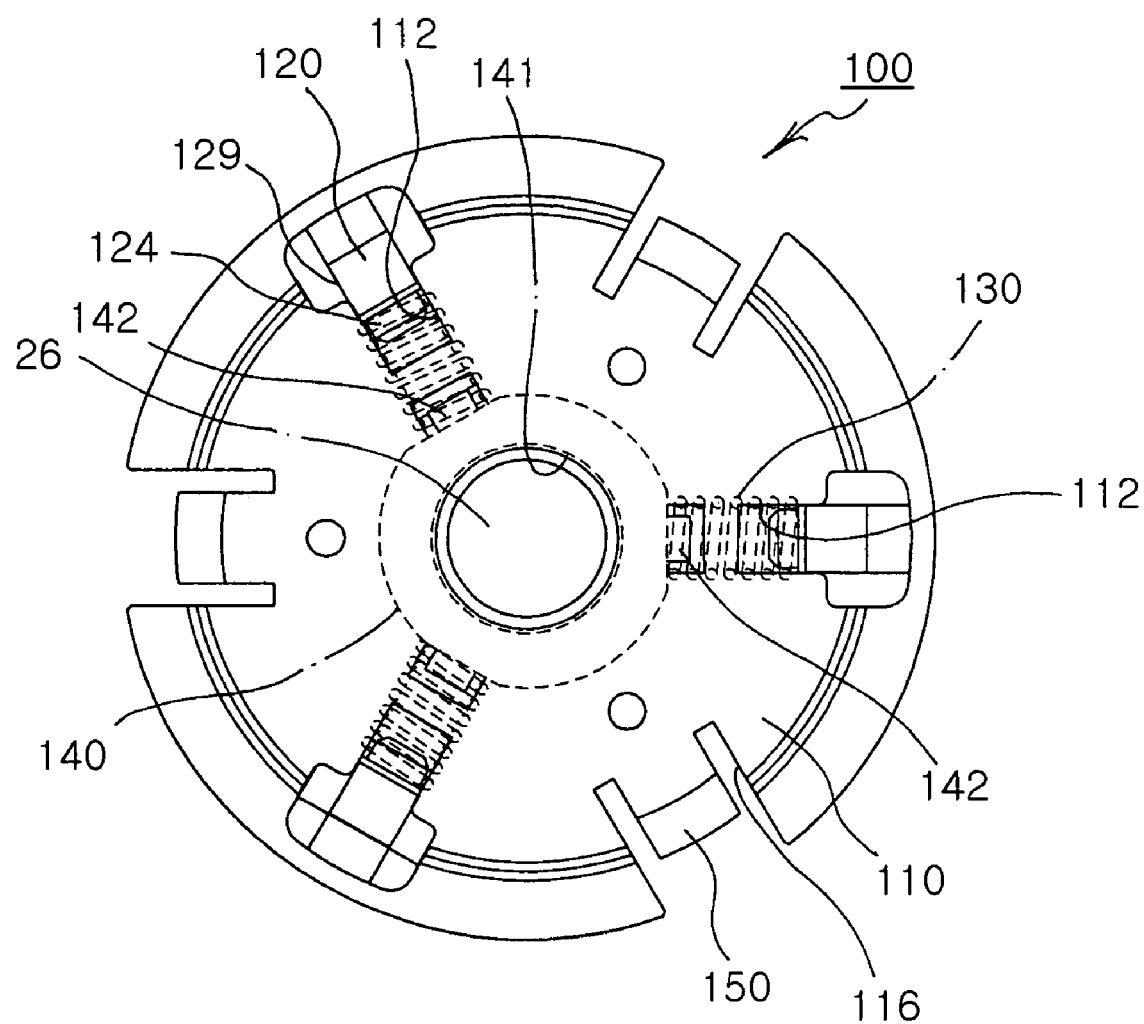
Figure 3B:
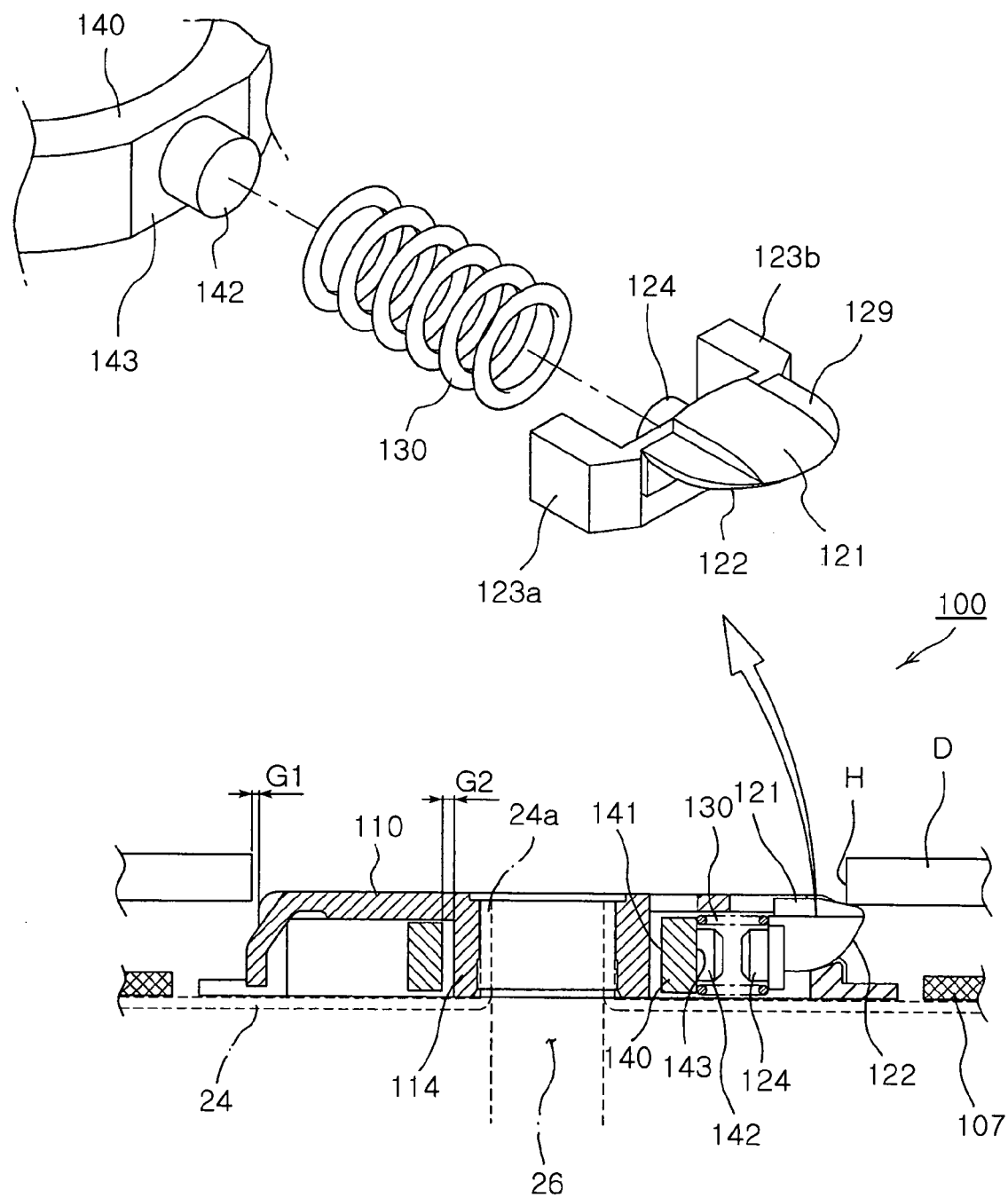
Figure 3C:
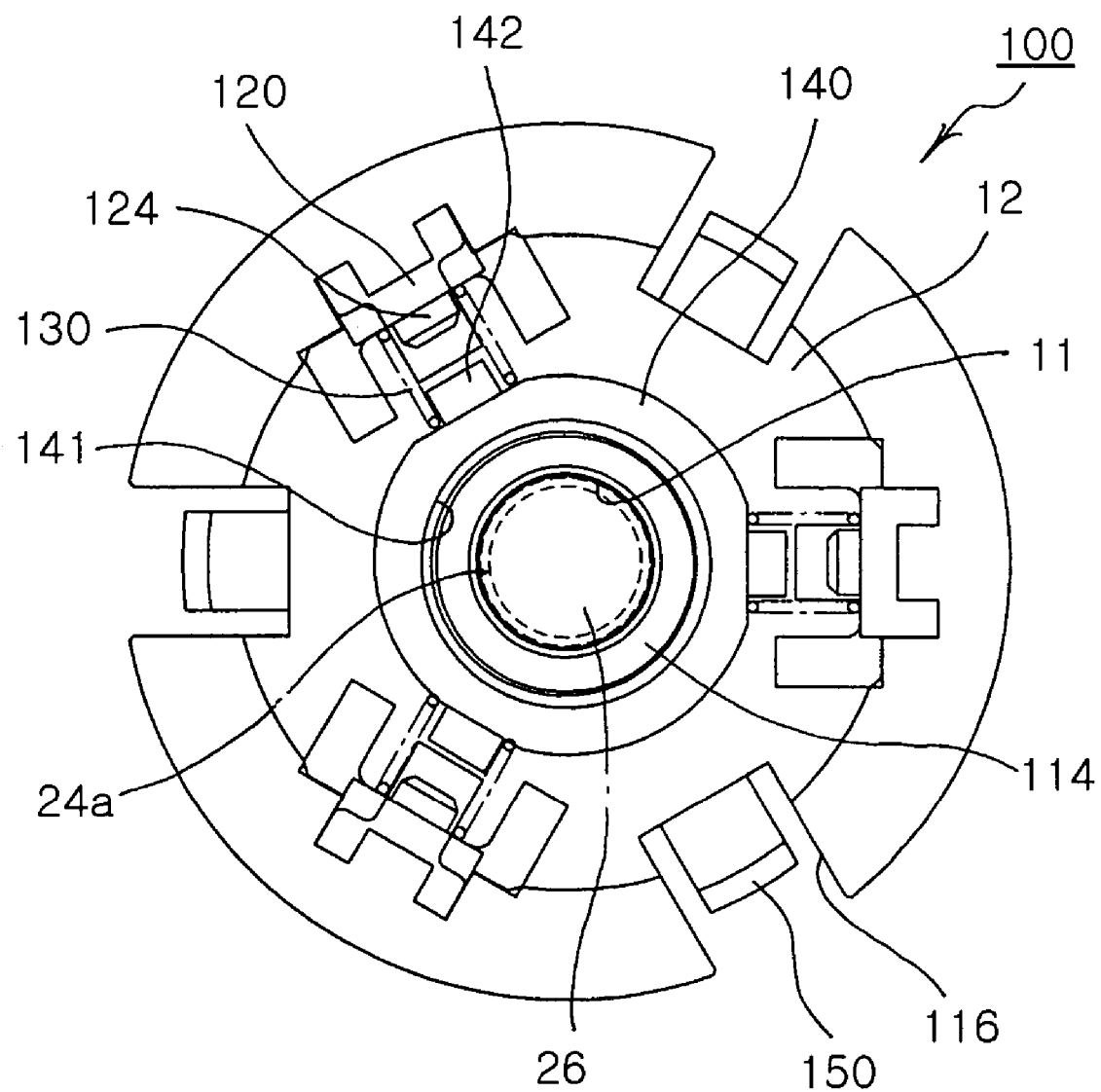
Figure 4:
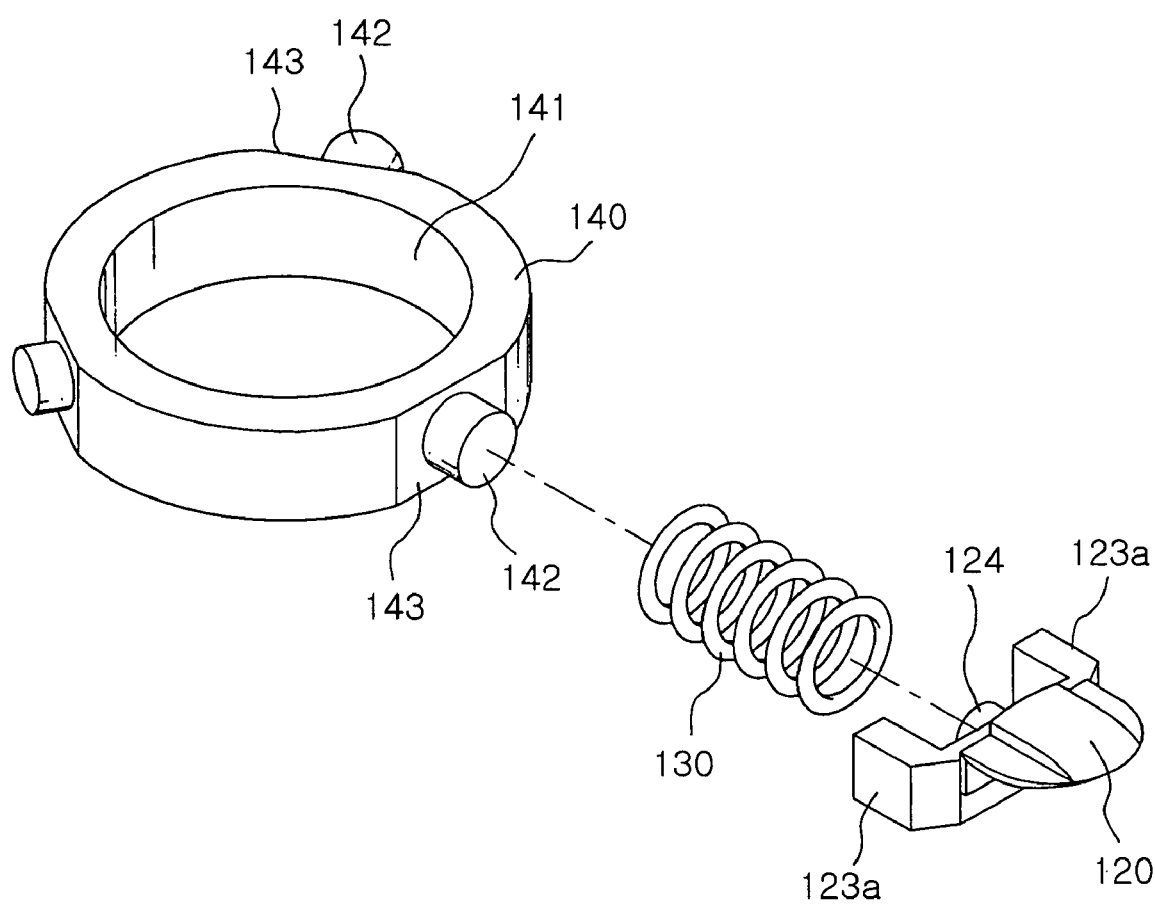
FIG. 4 is an exploded perspective view illustrating a rigid frame and a chuck pin of the disk-chucking device of the disk drive according to the present invention.

FIGS. 3a to 3c show a disk-chucking device of a disk drive according to the present invention, in which FIG. 3a is a plan view, FIG. 3b is a longitudinal section view, and FIG. 3c is a rear elevation. FIG. 4 is an exploded perspective view illustrating a rigid frame and a chuck pin of the disk-chucking device of the disk drive according to the present invention.

A disk-chucking device 100 according to the present invention may fix a disk, to be rotated, such that unidirectional rotation of the disk can be smoothly conducted, while chucking the disk such that the center of the disk is matched to the rotational center of a motor, and may prevent eccentricity causing the center of the chucked disk to be biased toward one side due to spring members 130 having different elastic forces. The disk-chucking device 100 of the present invention comprises a chuck base 110, chuck pins 120, spring members 130, and a rigid frame 140.

The disk-chucking device 100 of the present invention is equipped to a disk drive 1 having a motor 20, which comprises a stator 20a and a rotor 20b to supply a rotational driving force when electric power is applied thereto. A detailed description of the motor 20 will be omitted.

The chuck base 110, on which a disk D having a central void H of a predetermined size perforated at the center of the disk is inserted, is a rotational structure, of which the center is assembled to a vertical axis coaxial to a shaft 26 acting as the rotational center of the motor 20, such that it can be rotated in one direction together with the rotor 20b of the motor 20 and the disk D upon actuation of the motor 20.

The chuck base 110 has three or more arranging parts 112, which are recessed in a radial direction and uniformly spaced from each other along an outer periphery thereof on an outer surface of the chuck base 110 on which the central void H of the disk D is correspondingly inserted.

The chuck base 110 may be provided to an upper surface of a rotor case 24 of the rotor 20b, which is rotated in one direction against the stator 20a upon actuation of the motor 20. Alternatively, the chuck base 110 may be provided to a turntable, not shown, additionally assembled to the upper surface of the rotor case 24.

In the case where the chuck base 110 is provided to the rotor case 24, the chuck base 110 is integrally provided, at the center thereof, with a hollow cylindrical central boss 114 having a predetermined inner diameter. Here, an axial insert 24a is assembled to the central boss 114, and allows the shaft 26 of the motor 20 to be inserted therethrough. The axial insert 24a is upwardly extended from the center of the upper surface of the rotor case 24 up to a predetermined height above the upper surface thereof.

Accordingly, the axial insert 24a of the rotor case 26 and the central boss 114 of the chuck base 110 are disposed on the vertical axis coaxial to the shaft 26 of the motor 20, allowing the disk D on the chuck base 110 to be rotated in one direction together with the chuck base 110 upon actuation of the motor 20.

A rubber material 107 is mounted around the outer periphery of the rotor 24 on the upper surface of the rotor case 24 for generating a frictional force in order to prevent the disk from slipping upon rotation of the disk due to actuation of the motor by way of area contact between a lower surface of the disk D mounted on the chuck base 110 and an upper surface of the rubber material 107.

The chuck pins 120 are operational members, which are assembled to the arranging parts 112 recesses while being uniformly spaced from each other along the outer periphery of the chuck base 110 on the upper surface of the chuck base 110, respectively, such that they may be linearly moved on the chuck base 110. With this construction, the chuck pins 120 may be guided in the radial direction by virtue of a mounting or detaching force upwardly or downwardly applied thereto in the vertical direction by way of interference with upper or lower edges of the inner periphery of the central void H of the disk D each time the disk D is mounted or detached.

As shown in FIGS. 3a to 3c, each of the chuck pins 120 has an upper corner slope 121 gently and downwardly sloped toward the front of the chuck pin at an upper surface of the leading end of the chuck pin 120 interfering with the lower end of the central void H of the disk D upon detachment of the disk D from the chuck pins 120, and a lower corner slope 122 gently and upwardly sloped toward the front of the chuck pin at a lower surface of the leading end of the chuck pin 120 interfering with the upper end of the central void H of the disk D upon mounting the disk D. Additionally, each of the chuck pins 120 has elongated guides 129 formed in the radial direction at both sides of the upper corner slope 121 from a leading end of the upper corner slope 121 on the upper surface of the chuck pin 120 and connected to the corresponding arranging part 112 such that each of the chuck pins 120 can be smoothly reciprocated along the arranging part 112 of the chuck base 110.

Additionally, each of the chuck pins 120 assembled to the arranging parts 112 comprises wings 123a and 123b extending to the right and left sides of the chuck pin 120 at the rear end of the chuck pin 120 and latched to the arranging part 112 such that the chuck pin 120 is prevented from deviating from the arranging part 112, and an engagement jaw 124 protruded between the wings 123a and 123b such that the leading end of each of the spring members 130 is inserted on the engagement jaw 124 and fixed in position.

The spring members 130 are coil-shaped elastic bodies, which have an elastic force of a predetermined level to consistently and elastically support the chuck pins 120 provided to the chuck base 110 forwardly, and which are arranged between the chuck pins 120 and the central boss 114 of the chuck base 110, respectively.

Each of the spring members has one end inserted on and fixed to the engagement jaw 124 integrally protruded from the rear end of each of the chuck pins 120, and the other end contacting the rigid frame 140 in the central boss 114 and supported by the rigid frame 140.

The rigid frame 140 has flat upper and lower surfaces, and contacts the spring members 130 on an outer surface of the rigid frame 140 corresponding to the chuck pins 120 such that the rigid frame 140 can be elastically supported by the other end of the spring members 130 having one end contacting the rear end of the chuck pins 120.

The rigid frame 140 is formed, at the center thereof, with a central hole 141 vertically penetrating the rigid frame 140. The central hole 141 has an inner diameter larger than the outer diameter of the central boss 114 such that the rigid frame 140 can be disposed in the center of the disk-chucking device and spaced a predetermined distance G2 from the central boss 114 without interfering with the central boss 114 when disposing the rigid frame 140 into the central boss 114 of the chuck base 110.

Accordingly, the rigid frame 140 has a degree of freedom, which allows the rigid frame 140 not only to be raised in a state of being separated from the upper surface of the rotor case 24 by virtue of the elastic force of the spring members 130 elastically supporting the chuck pins 120, but also to be moved in the horizontal direction in an allowable range of the predetermined distance G2 defined between the outer peripheral surface of the central boss 114 and an inner peripheral surface of the central hole 141 of the rigid frame 140.

Specifically, even though the spring members 130, having different elastic forces resulting from the manufacturing process are provided between the rigid frame 140 and the plurality of chuck pins 120, deviation of force generated between the spring members 130 elastically supporting the chuck pins 120 forwardly is transmitted to the rigid frame 140 having the degree of freedom through the chuck pins 120 instead of being transmitted to the disk D. As a result, the disk D can be chucked to the disk drive such that the center of the disk D and the rotational center of the motor coincide with each other.

At this time, the predetermined distance G2 defined between the outer peripheral surface of the central boss 114 and the inner peripheral surface of the central hole 141 of the rigid frame 140 is preferably larger than a distance G1 defined between the inner peripheral surface of the central void H of the disk D inserted on the chuck base 110 and the outer peripheral surface of the chuck base 110.

The rigid frame 140 has a plurality of latches 142 formed on the outer surface thereof at locations corresponding to the rear end of the chuck pins 120 for latching the other end of the spring members 130. As with the engagement jaws 124 of the chuck pins 120, each of the latches 142 is preferably protruded from the outer peripheral surface of the rigid frame 140 to prevent the spring members 130 from being disengaged. Alternatively, each of the latches 142 may be depressed in the shape of a recess for ensuring a sufficient length of the spring members 130.

The latches 142 are preferably formed at the locations on the surface of the rigid frame 140 corresponding to the three apexes of an equilateral triangle centering on the central hole 141 of the rigid frame 140, respectively. At this time, the latches 142 may be provided on a round surface of the outer peripheral surface of the rigid frame 140 or on a flat plane 143 formed at positions corresponding to the three apexes of the equilateral triangle centering on the central hole 141.

A plurality of cutaway sections 116 are formed, and spaced a uniform distance from each other between the arranging parts 112 on the outer surface of the chuck base 110 on which the chuck pins 120 are mounted. The cutaway sections 116 are integrally provided with elastic pieces 150 having an approximately L-shaped cross-section, respectively, such that the outer diameter of the elastic pieces 150, formed by drawing a line continuously connecting outer peripheral surfaces of the elastic pieces 150, can be larger than the inner diameter of the central void H of the disk D.

In this case, an outer surface of the leading end of each of the elastic pieces 150 is compressed toward the inner side, and elastically deformed upon mounting the disk D, and uniformly supports the inner peripheral surface of the central void 15 of the disk D with their elastic force after mounting the disk D, thereby enhancing an automatic centering function to match the center of central void H to the rotational center of the motor 20.

Such elastic pieces 150 for the automatic centering function are equipped between the chuck pins 120 spaced the uniform distance from each other in the circumferential direction, and elastically support the inner peripheral surface of the central void H of the disk D such that the center of the disk D mounted on the chuck base 110 and the rotational center of the chuck base 110 can be located on the same vertical axis.

Figure 5A:
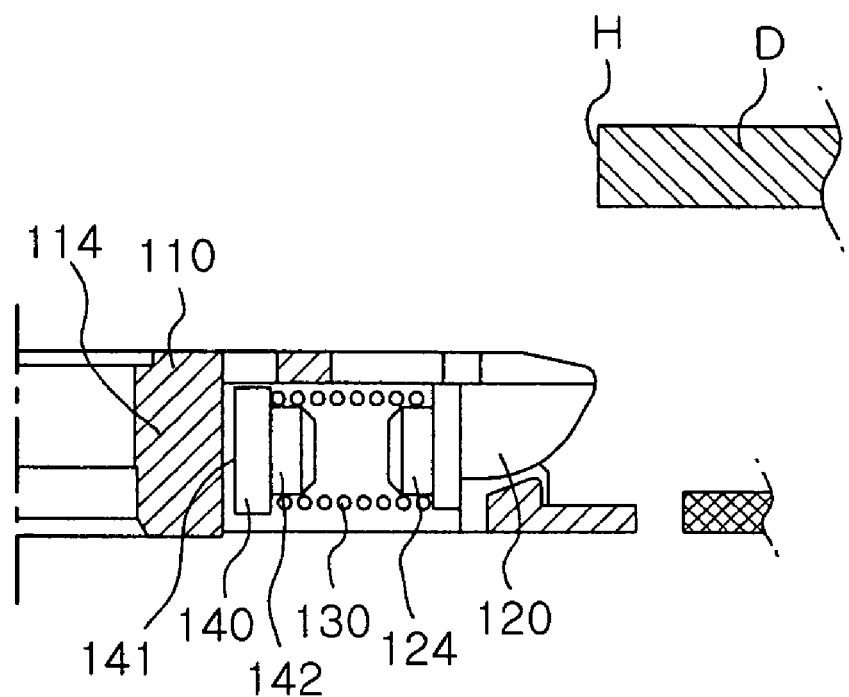
FIGS. 5a to 5d are flow diagrams illustrating a process of chucking a disk using the disk-chucking device of the disk drive according to the present invention.

When performing the operation of mounting the disk D on the chuck base 110 using the disk-chucking device 100 of the present invention having the construction as described above, as shown in FIG. 5a, the disk D to be chucked is disposed directly above the chuck base 110, and is then vertically lowered with the central void H of the disk D matched to the chuck base 110, allowing the disk D to be mounted on the chuck base 110.

Figure 5B:
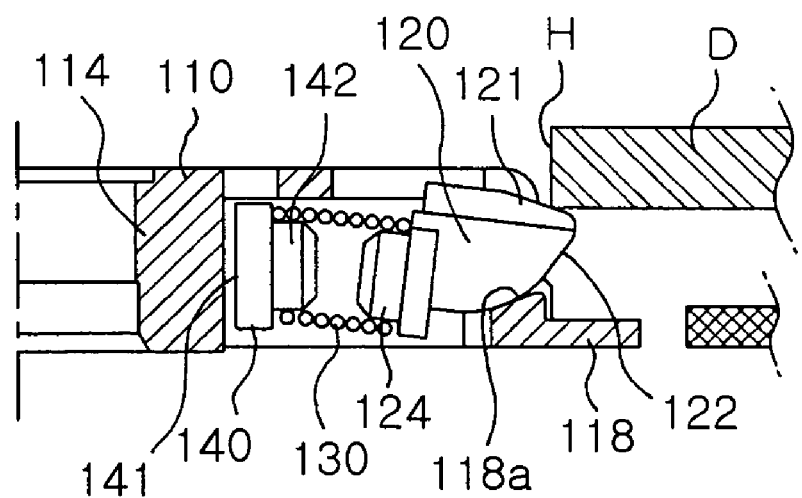

Since the outer diameter of the chuck base 110 is smaller than the inner diameter of the central void H of the disk D while the respective lead ends of the chuck pins 120 provided to the arranging parts 112 of the chuck base 110 extend outwardly from the outer surface of the chuck base 110, the lower end of the central void H of the disk D contacts and then interferes with the upper corner slope 121 formed on the upper surface of the leading end of the chuck pins 120, as shown in FIG. 5b.

Figure 5C:
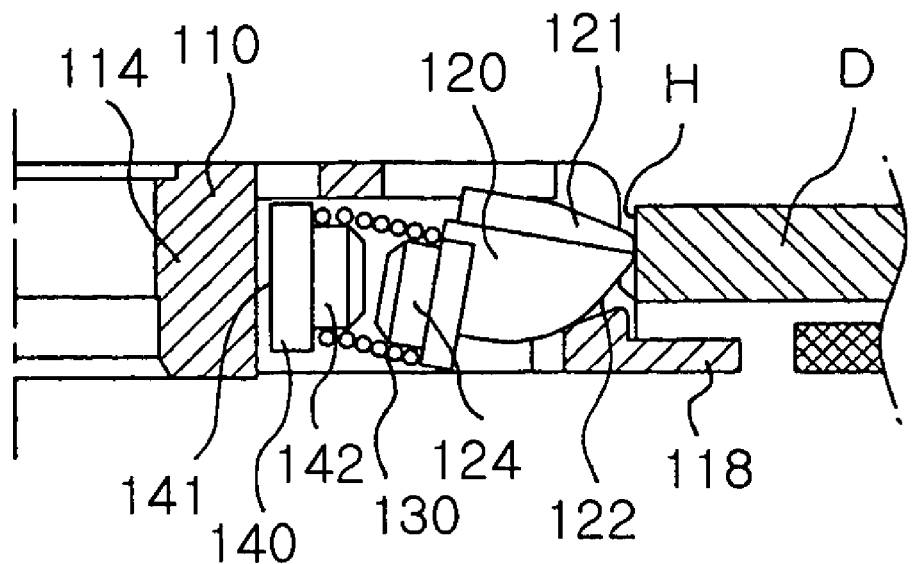

At the same time, as shown in FIGS. 5b and 5c, the plurality of chuck pins 120 are moved backward to the central boss 114 along the arranging parts 112 of the chuck base 110 and inserted into the arranging parts 112 of the chuck base 110, by virtue of a mounting force $F_f$, which is an external force to vertically lower the disk D.

In this case, the spring members 130 provided between the rigid frame 140 disposed in the central boss 114 of the chuck base 110 and the chuck pins 120 are compressed by a moving distance of the chuck pins 120 moved backward into the arranging parts 112, and thereby generating an elastic restoration force.

At this time, since the chuck base 110 is formed, at an outer periphery of the lower end thereof, with a ring-shaped support 118, the lower surface of the disk D is supported by the support 118 in area contact with the support 118. Since the support 118 is formed with a curved portion 118a at an upper surface thereof corresponding to the chuck pins 120 such that the support 118a contacts the lower corner slope 122 formed at the lower surface of the leading end of the chuck pins 120 upon mounting the disk D, the chuck pins 120 can be hinged downwardly concurrently with being inserted into the arranging parts 112 to compress the spring members 130.

Figure 5D:
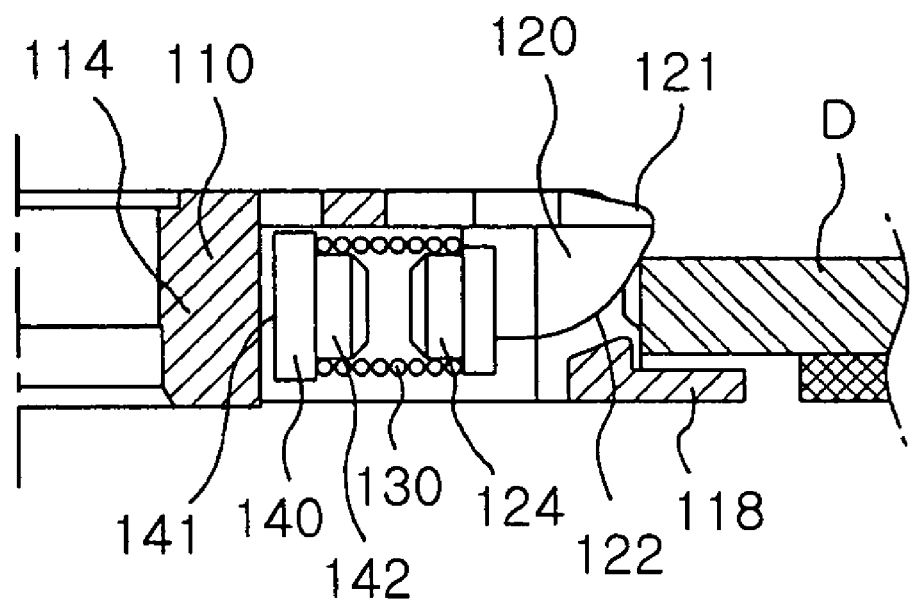

As shown in FIG. 5d, when the inner peripheral surface of the central void H of the disk D passes the outermost leading end of the chuck pins 120, the chuck pins 120 are returned forwardly to their initial state along the arranging parts 112, since the chuck pins 120 are connected to one end of the spring members 130 generating the elastic restoration force upon compression of the spring members 130.

Then, the lower corner slope 122 formed at the lower surface of the leading end of the chuck pins 120 contacts the upper end of the central void H of the disk D inserted into the chuck base 110, and the elastic force of the spring members 130 elastically supporting the chuck pins 120 forwardly is transmitted to a plurality of contact portions, thereby allowing the disk D to be fixed in position to the disk drive.

Meanwhile, it is difficult to manufacture the spring members 130, provided between the rigid frame 140 disposed in the central boss 114 of the chuck base 110 and the plurality of chuck pins 120, such that the spring members 130 have the same elastic force. Accordingly, in the case where a relatively large elastic force is transmitted to one of the plurality of contact portions where the chuck pins 120 contact the central void H of the disk D, eccentricity can occur, biasing the center of the disk D to one side of the rotational center of the motor 20.

However, according to the present invention, with the rigid frame 140 connected to the other end of the spring members 130 and disposed in the central boss 114 of the chuck base 110 not to interfere with the central boss 114 by providing the central hole 141 vertically penetrating the center of the rigid frame 140, inequality of the forces caused by the different elastic forces of the spring members provided between the plurality of chuck pins 120 and the rigid frame 140 can be removed, thereby preventing the eccentricity of the disk D.

Since the inner diameter of the central hole 141 of the rigid frame 140 disposed in the central boss 114 is larger than the outer diameter of the central boss 114, the rigid frame 140 can be freely moved in the horizontal direction in an allowable range of the predetermined distance G2 defined between the inner peripheral surface of the central hole 141 and the outer peripheral surface of the central boss 114.

In this state, if one of the external forces generated by the spring members 130 elastically supporting the chuck pins 120 forwardly to chuck the disk D is larger than the others, a deviation of force occurs between the forces. The deviation of force is transmitted to the rigid frame 140 having the degree of freedom in the horizontal direction through the chuck pins 120 elastically supporting the disk D forwardly instead of being transmitted to the disk D.

Accordingly, the rigid frame 140 can be freely moved in the horizontal direction within the space defined between the chuck base 110 and the rotor case 24, and thus allows the spring members 130 having a larger elastic force to be expanded, reducing the external force transmitted to the chuck pins 120 while allowing the spring members 130 having a smaller elastic force to be compressed, increasing the external force transmitted to the chuck pins 120.

In this case, even though the spring members 130 have different elastic forces, the forces transmitted to the disk D through the chuck pins 120 can be applied to the disk D in the same magnitude. As a result, the center of the disk D chucked to the chuck base 110 by the chuck pins 120 can be accurately matched to the rotational center of the motor 20, thereby allowing accurate and smooth operation for recording and/or reproducing data on a recording surface of the disk by means of an optical pick-up unit.

In the case where the deviation of force transmitted to the disk D through the chuck pins 120 becomes zero, the rigid frame 140 is in a stationary state, and the stationary state of the rigid frame 140 is maintained during chucking of the disk D.

Meanwhile, since the cutaway sections 116 formed on the outer surface of the chuck base 110 are integrally provided with the plurality of elastic pieces 150 having an approximately L shape, each of the elastic pieces 150 transmits the elastic force to the central void H of the disk D contacting the outer surface of the elastic pieces 150 in a state of being deflected and elastically deformed toward the central boss 114, thereby enhancing the automatic centering function to match the center of the central void H to the rotational center of the motor.

As is apparent from the above description, according to the present invention, the rigid frame, which contacts the other end of the spring members elastically supporting the chuck pins forwardly, is disposed in the central boss of the chuck base such that it can be moved in the horizontal direction within the allowable range, whereby, even though the elastic forces of the spring members respectively provided to the chuck pins are not the same, the forces transmitted to the disk through the chuck pins are uniform, allowing accurate and smooth recording and/or reproduction of data on a recording surface of the disk by way of accurately matching the center of the disk chucked to the chuck base and the rotational center of the motor.

Furthermore, unnecessary movement of the optical pick-up unit is also reduced, thereby decreasing energy consumption, and increasing life span of the disk drive.

It should be understood that the embodiments and the accompanying drawings as described above have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A disk-chucking device of a disk drive, provided to a motor to supply a rotational driving force for chucking a disk to be rotated, the disk-chucking device comprising:
   a chuck base having a plurality of arranging parts recessed along an outer periphery of the chuck base on which a central void of a disk is correspondingly inserted, and formed at the center of the chuck base with a central boss connected to the motor so that the chuck base can be rotated together with a rotor of the motor;
   a plurality of chuck pins respectively assembled to the arranging parts so that they can reciprocate in a radial direction;
   a plurality of spring members elastically supporting a rear end of the chuck pins forwardly such that a leading end of the chuck pins can be exposed to an outer surface of the chuck base; and
   a rigid frame contacting the spring members at an outer surface of the rigid frame facing the chuck pins such that it can be elastically supported by the other end of the spring members having one end contacting the rear end of the chuck pins, the rigid frame being formed, at the center thereof, with a central hole vertically penetrating the rigid frame such that the central hole has an inner diameter larger than an outer diameter of the central boss, thereby providing a degree of freedom allowing the rigid frame to be moved in a horizontal direction within an allowable range such that the center of the disk can be matched to a rotational center of the motor upon inequality of elastic forces of the spring members;
   wherein the rigid frame has a plurality of latches formed on the outer surface thereof facing the chuck pins for latching the other end of the spring members.

2. The device as set forth in claim 1, wherein the latches are formed at locations on the outer surface of the rigid frame corresponding to three apexes of an equilateral triangle centering on the central hole of the rigid frame, respectively.

3. The device as set forth in claim 1, wherein the latches are provided on flat planes formed at the locations on the outer surface of the rigid frame corresponding to three apexes of an equilateral triangle centering on the central hole of the rigid frame, respectively.

4. The device as set forth in claim 1, wherein the distance between an inner peripheral surface of the central hole of the rigid frame and the outer peripheral surface of the central boss is larger than that between the inner peripheral surface of the central hole of the rigid frame and an outer peripheral surface of the chuck base.

5. The device as set forth in claim 1, wherein the chuck base has a plurality of cutaway sections formed between the arranging parts on the outer surface of the chuck base, and a plurality of elastic pieces integrally provided to the cutaway sections for an automatic centering function, each of the elastic pieces elastically supporting the inner peripheral surface of the central void of the disk contacting an outer surface of a leading end of the elastic piece with its elastic force.

6. A disk-chucking device for chucking a disk to be rotated by a motor of a disk drive, the disk-chucking device comprising:
   a chuck base having
      a plurality of arranging parts recessed along an outer periphery of the chuck base and adapted to be inserted into a central void of the disk to be chucked, and
      a central boss formed at the center of the chuck base and adapted to be connected to the motor so that the chuck base is rotatable together with a rotor of the motor;
   a plurality of chuck pins respectively assembled to the arranging parts so that the chuck pins are reciprocable in radial directions of said chuck base;
   a plurality of spring members each elastically supporting and urging a rear end of one of the chuck pins outwardly such that a leading end of said one of the chuck pins is exposable on an outer surface of the chuck base; and a rigid frame contacting the spring members at an outer surface of the rigid frame facing the chuck pins such that the rigid frame supports a first end of each of the spring members having a second end supporting the rear end of the respective chuck pin;

the rigid frame being formed, at the center thereof, with a central hole axially penetrating the rigid frame such that the central hole has an inner diameter larger than an outer diameter of the central boss, thereby providing a degree of freedom allowing the rigid frame to be moveable in a radial plane within an allowable range such that the center of the disk can be matched to a rotational center of the motor even if elastic forces of the spring members are not equal;

wherein the rigid frame has a plurality of latches formed on the outer surface thereof facing the chuck pins for latching the first ends of the spring members.

7. The device as set forth in claim 6, wherein the latches are formed at locations on the outer surface of the rigid frame corresponding to three apexes of an equilateral triangle centering on the central hole of the rigid frame, respectively.

8. The device as set forth in claim 7, wherein the latches are provided on flat planes on the outer surface of the rigid frame at said locations.

9. The device as set forth in claim 6, wherein the distance between an inner peripheral surface of the central hole of the rigid frame and an outer peripheral surface of the central boss is larger than that between the inner peripheral surface of the central hole of the rigid frame and an outer peripheral surface of the chuck base.

10. The device as set forth in claim 6, wherein the chuck base further has a plurality of cutaway sections formed between the arranging parts on the outer surface of the chuck base, and a plurality of elastic pieces integrally provided with the cutaway sections for elastically supporting an inner peripheral surface of the central void of the disk contacting an outer surface of a leading end of each of the elastic pieces, thereby automatically centering the central void of the disk on the rotational center of the motor.

11. A disk-chucking device for chucking a disk to be rotated by a motor of a disk drive, the disk-chucking device comprising:

a chuck base having a plurality of arranging parts recessed along an outer periphery of the chuck base and adapted to be inserted into a central void of the disk to be chucked, and a central boss formed at the center of the chuck base and adapted to be connected to the motor so that the chuck base is rotatable together with a rotor of the motor;

a plurality of chuck pins respectively assembled to the arranging parts so that the chuck pins are reciprocable in radial directions of said chuck base;

a plurality of spring members each elastically supporting and urging a rear end of one of the chuck pins outwardly such that a leading end of said one of the chuck pins is exposable on an outer surface of the chuck base; and a rigid frame contacting the spring members at an outer surface of the rigid frame facing the chuck pins such that the rigid frame supports a first end of each of the spring members having a second end supporting the rear end of the respective chuck pin;

the rigid frame being formed, at the center thereof, with a central hole axially penetrating the rigid frame such that the central hole has an inner diameter larger than an outer diameter of the central boss, thereby providing a degree of freedom allowing the rigid frame to be moveable in a radial plane within an allowable range such that the center of the disk can be matched to a rotational center of the motor even if elastic forces of the spring members are not equal;

wherein the distance between an inner peripheral surface of the central hole of the rigid frame and an outer peripheral surface of the central boss is larger than that between the inner peripheral surface of the central hole of the rigid frame and an outer peripheral surface of the chuck base.

12. The device as set forth in claim 11, wherein the chuck base further has a plurality of cutaway sections formed between the arranging parts on the outer surface of the chuck base, and a plurality of elastic pieces integrally provided with the cutaway sections for elastically supporting an inner peripheral surface of the central void of the disk contacting an outer surface of a leading end of each of the elastic pieces, thereby automatically centering the central void of the disk on the rotational center of the motor.

* * * * *